Oct. 27, 1964    F. G. BOUCHER    3,154,169
SEISMIC MODEL
Filed July 24, 1962
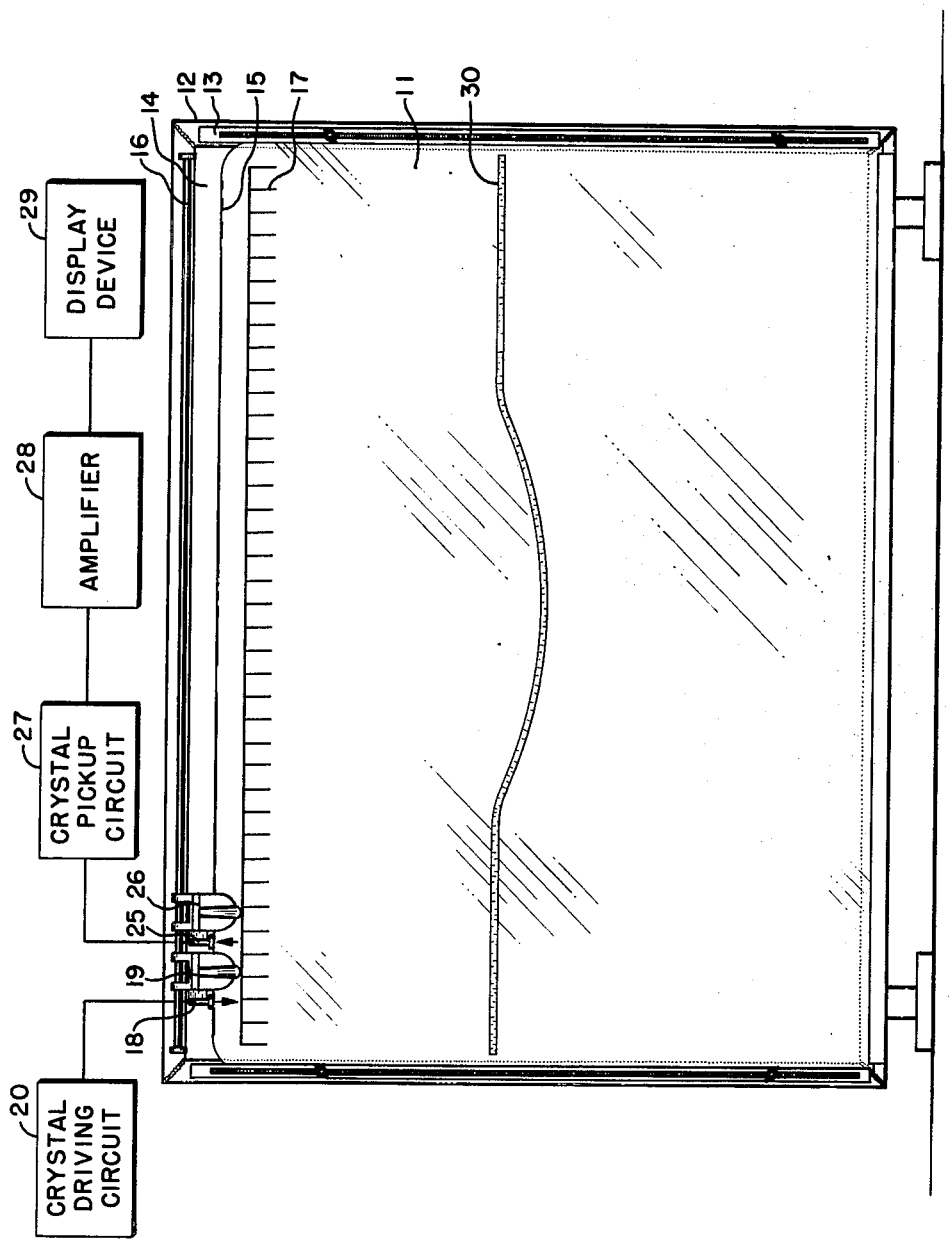
FRANK G. BOUCHER INVENTOR.
BY James E. Reed
ATTORNEY 3,154,169
SEISMIC MODEL
Frank G. Boucher, Catoosa, Okla., assignor to Jersey Production Research Company, a corporation of Delaware
Filed July 24, 1962, Ser. No. 212,062
9 Claims. (Cl. 181—.5)

The present invention relates to seismic prospecting and is particularly concerned with an improved seismic model useful in interpreting records obtained in seismic prospecting operations.

Anticlines, synclines, faults, pinch-outs and similar geological structures are often difficult to identify on field records obtained during seismic prospecting operations. Seismic models have been used to a limited extent to facilitate the identification of such structures. By preparing a model simulating an assumed subsurface structure and then using the model to produce a synthetic seismogram, the probable existence of the assumed structure in the area under investigation can often be confirmed or refuted. The principal problem encountered in utilizing this technique lies in the difficulty in constructing the necessary model. Some success has been achieved with simple one dimensional models prepared from metallic rods of varying cross-sections and with more complex models fabricated by machining sheets of plastic or similar material or building up the desired structure with casting materials and suitable molds. Such models are expensive and have pronounced disadvantages in that they do not permit the combining of several structures into a complicated geologic section so that field records can be fully duplicated by model studies. Moreover, such models cannot readily be altered and re-used. A separate model must be prepared for each assumed geologic structure. Because of these disadvantages, models have not been widely used for seismic interpretation purposes.

It is therefore an object of the present invention to provide an improved model useful in the interpretation of seismic records. Another object is to provide a seismic model which will permit the simulation of multiple structures within a subsurface formation. A further object is to provide a seismic model which can be readily modified and thus used to simulate a variety of different subsurface structures. Still other objects will become apparent as the invention is described in greater detail hereafter.

In accordance with the invention, it has now been found that many of the difficulties encountered in seismic model work carried out in the past can be avoided by utilizing a model in which subsurface structures are represented in two dimensions by strips of a thin flexible material affixed with a suitable adhesive to a rigid sheet of material capable of transmitting acoustic vibrations. The sheet and strips should be made of materials having different acoustical properties. Tests have shown that the use of such a model permits the simulation of multiple geologic structures in a subsurface formation and the preparation of synthetic seismograms showing the effect of such multiple structures in actual seismic prospecting operations, that complex structures can be simulated more quickly and at less expense with such a model than with conventional equipment, and that models constructed in this manner can be readily modified to permit the simulation of various structures in subsurface strata. These advantages make the model of the invention considerably more attractive for use in seismic model study than models available in the past.

The nature and objects of the invention can best be understood by referring to the following detailed description and accompanying drawing illustrating the improved seismic model and its use.

The apparatus depicted in the drawing comprises an elongated sheet 11 of plastic, aluminum or similar material capable of transmitting acoustic vibrations. Suitable plastics include the acrylic resins marketed under the trade name "Lucite" by E. I. du Pont de Nemours and Company of Wilmington, Delaware and under the trade name "Plexiglas" by Rohm and Haas of Philadelphia, Pennsylvania. The material selected should have sufficient strength and rigidity to permit it to be suspended in a vertical plane while supported at the edges. The use of a transparent material as indicated facilitates the representation of subsurface structures and is therefore preferable. A 4' x 8' sheet of $3/16''$ "Plexiglas" has been found particularly effective. The sheet shown rests in a slot in the lower part of a metallic frame 12 and is held in place against the frame by slotted bars 13, in turn secured by wing nuts and bolts. The frame and bars support the sheet at the bottom and sides, leaving a gap 14 above its upper edge 15. A rod 16 extends along the upper part of the frame. A horizontal scale 17 is provided on the sheet and extends across it from one side of the model to the other.

A piezoelectric transducer 18 is mounted in the gap 14 between the frame and the upper edge of the sheet enclosed therein. The transducer is held in place by means of a clamp 19 which engages rod 16 on the frame and thus permits the transducer to be positioned at any desired location within the gap. The scale on the sheet indicates the position of the transducer. The transducer contains one or more crystals of quartz, Rochelle salt, tourmaline or similar piezoelectric material. The crystal is mounted in a suitable holder so that it engages the upper edge of the sheet and is provided with electrodes by means of which an electric field may be applied to it from a suitable crystal driving circuit 20. The driving circuit may be of conventional design. Piezoelectric crystals useful in transducers intended to create mechanical vibrations and electrical circuits for driving them are described by Cady in "Piezoelectricity," published by Mc-Graw Hill Book Company of New York in 1946, and elsewhere in the technical literature.

Piezoelectric transducer 25 is similar to transducer 18 except that it utilizes the direct piezoelectric effect for the production of an electrical signal, rather than the converse effect for the production of a mechanical signal as in the earlier case. The arrows shown on the drawing indicate that transducer 18 is utilized as a source; while transducer 25 serves as a detector. Transducer 25 is mounted in gap 14 and supported by means of clamp 26 which engages rod 16. The transducer includes one or more piezoelectric crystals mounted in contact with the upper edge of sheet 11. Electrical impulses generated by the crystal in response to mechanical vibrations of the sheet are transmitted to a crystal pickup or preamplifier circuit 27 which may be of conventional design. The output terminals of the crystal pickup or preamplifier circuit are connected to an amplifier 28 which is in turn connected to a display device 29. Any of a variety of display devices may be utilized. Suitable devices include variable density, variable area, and oscillographic recorders of the type employed conventionally for seismic recording purposes, coupled with conventional means for translating the ultra-high frequencies from the piezoelectric transducer to frequencies within the seismic range. In lieu of using such a system, the amplifier output signal may be displayed on a cathode ray tube or oscilloscope. The output from the oscilloscope can be applied to a conventional recorder or photographed for use in interpretation work.

Thin strips of a material 30 capable of being bent into the desired shape are mounted on both sides of sheet 11 with an adhesive in order to simulate subsurface structures. The strips employed may range in thickness from about 0.001 inch up to about 0.25 inch or more and may be from about 0.0625 to about 1 inch or more in width. Suitable materials include thin flexible strips of cardboard, paper, fabric, rubber, plastic, copper or the like. The strips employed should be of a material different from that from which the sheet is made. They will preferably be pretreated with a pressure sensitive adhesive so that they can be readily applied to the sheet and used repeatedly. Excellent results have been obtained by using thin strips of ordinary drafting or adhesive tape. Although a single strip of tape simulating one structure is shown on the model in the drawing, several strips representing multiple structures present in a complex subsurface interval may be used if desired. Several thicknesses of tape or similar material can be used where necessary to create the effect of differences in reflection coefficients.

The model shown in the drawing is utilized by first placing strips of tape or similar material 30 on both sides of the sheet 11 to simulate the assumed subsurface structure or structures. The structure simulated by the tape shown is a syncline having its center of curvature above the surface. As pointed out earlier, a plurality of structures present in a complex subsurface interval may be represented. Excellent results have been obtained with models containing as many as six distinct structures. After the tape or other flexible material has been placed in the desired position on the model, the two piezoelectric transducers are positioned in gap 14 of the model. In some cases transducer 18 representing the signal source will be held in a fixed position and transducer 22 representing a geophone or detector will be moved with repect to it; while in other cases the two transducers will be used at a fixed distance from one another. In the latter case, both transducers may be mounted on a single carriage movable within gap 14. The spacing and location of the transducers will depend upon the type of seismic record it is desired to simulate. It is generally preferred to position the transducers close to one another and progressively move them across the sheet while maintaining constant spacing. This gives a series of simulated shot points and detector locations and results in a profile similar to that obtained in an actual seismis prospecting operation. Following the positioning of the transducers in their initial position, impulse transducer 18 is actuated by the application of an electrical field to the transducer crystal from crystal driving circuit 20. The oscillation of the crystal produced by the field results in the generation of acoustic waves which travel downwardly through sheet 11 and on reaching the section of the sheet to which the tape or similar material is attached are in part reflected back to the upper edge of the sheet. Here the wave energy is transferred to the crystal in transducer 25, resulting in the production of an electrical signal in crystal pickup circuit 27. This signal is amplified in amplifier 28 and fed to recorder or similar display device 29. The signal may be recorded as a plot of amplitude versus time so that it will thus correspond to a trace on a conventional seismic record. A second trace may then be prepared by moving one or both transducers to a new location within the gap and again actuating the impulse transducer. A series of traces corresponding to those on the seismic record of interest can thus be prepared. These traces can then be mounted side by side to produce a synthetic record which can be compared with actual field records to assist in interpreting the field records.

A typical model constructed in accordance with the invention utilizes a 4′ x 8′ sheet of "Plexiglas" 3/16 of an inch thick and drafting tape about 1/2 inch wide. An impulse initiated at the edge of the plastic sheet travels at a velocity of about 7700 feet per second. The initial content of high frequencies is reduced by rapid attenuation within the first inch or so of downward travel and hence the originally very narrow pulse broadens by a factor of about 3. The pulse from a dynamite shot during actual seismic prospecting operations undergoes changes of the same magnitude. Measurements have shown that the range of reflection coefficients which can be obtained by employing varying thicknesses of tape are close to those actually present in sedimentary subsurface strata. The cycle breadth of the received pulse in the unit is approximately 20 microseconds and the wave length is about 1 5/8 inches. These values, multiplied by a thousand, correspond to cycle breadths of 0.020 millisecond and wave lengths of 140 feet, values commonly encountered in seismic prospecting operations. The use of a scaling factor of 1,000 with this particular unit thus gives results which can be readily used in making the calculations necessary for the interpretation of seismic records obtained in the field. The thicknesses of reflecting strata and the locations of such strata can readily be calculated on records prepared with the model. Models with other scaling factors can readily be designed by utilizing a sheet of material other than "Plexiglas" and by selecting other dimensions.

It will be recognized by those skilled in the art that the use of a model of the type described above makes possible the direct investigation of seismic field problems and also facilitates the investigation of problems based on hypothetical structural configurations. Diffractions, multiple branch reflections and other steep dip events can readily be studied. Wave propagation mechanisms and other basic work can be pursued. The model of the invention is thus an extremely useful tool which has many applications in the seismic prospecting field.

What is claimed is:

1. A method for investigating subsurface structures which comprises simulating assumed structures by applying a thin strip of flexible material to the face of a rigid sheet of material capable of transmitting acoustic vibrations, applying an impulse to an edge of said sheet at a first point, detecting acoustic vibrations returned by said strip to said edge of said sheet at a second point, and displaying vibrations detected at said second point.

2. A method for studying the reflecting characteristics of subsurface structures which comprises applying a strip of tape to the face of a sheet of acrylic resin to simulate an assumed subsurface structure, applying an impulse to the edge of said sheet above said strip, detecting impulses reflected by said strip to said edge of said sheet, and displaying the detected impulses.

3. The method of claim 2 wherein strips of tape representing a plurality of assumed structures are affixed to the face of said sheet.

4. The method of claim 3 wherein multiple layers of tape are affixed to said sheet to create the effect of differences in reflection coefficients.

5. Apparatus for studying subsurface structures which comprises a sheet of rigid material capable of transmitting acoustic vibrations, a strip of a flexible material affixed to said sheet to simulate a subsurface structure, means for applying an impulse to an edge of said sheet, means for detecting impulses reflected by said strip to said edge of said sheet, and means for displaying impulses detected at said edge of said sheet.

6. Apparatus for studying the reflecting characteristics of subsurface structures which comprises a thin sheet of rigid plastic, strips of tape affixed to said sheet to simulate subsurface structures, a first transducer for applying an impulse to an edge of said sheet above said strips, a second transducer for detecting impulses reflected to said edge of said sheet by said strips, and means for displaying impulses detected by said second transducer.

7. Apparatus as defined by claim 6 wherein said first and second transducers comprise piezoelectric crystals.

8. Apparatus as defined by claim 6 wherein said display means comprises an oscilloscope.

9. A method for preparing a synthetic seismic trace which comprises applying a strip of tape to both sides of a sheet of crylic resin to simulate an assumed subsurface structure, applying an acoustic impulse to the edge of said sheet above said strip, detecting acoustic impulses reflected to said edge of said sheet by said strip, displaying the detected impulses on an oscilloscope, and photographing the trace displayed on said oscilloscope.

References Cited in the file of this patent
UNITED STATES PATENTS

| | | |
|---|---|---|
| 2,885,023 | Walker | May 5, 1959 |
| 3,009,527 | Berryman et al. | Nov. 21, 1961 |
| 3,047,965 | Walker | Aug. 7, 1962 |